Feb. 14, 1961     G. C. RORIE ET AL     2,971,568
CONVERTIBLE SEAT
Filed June 29, 1959     2 Sheets-Sheet 1
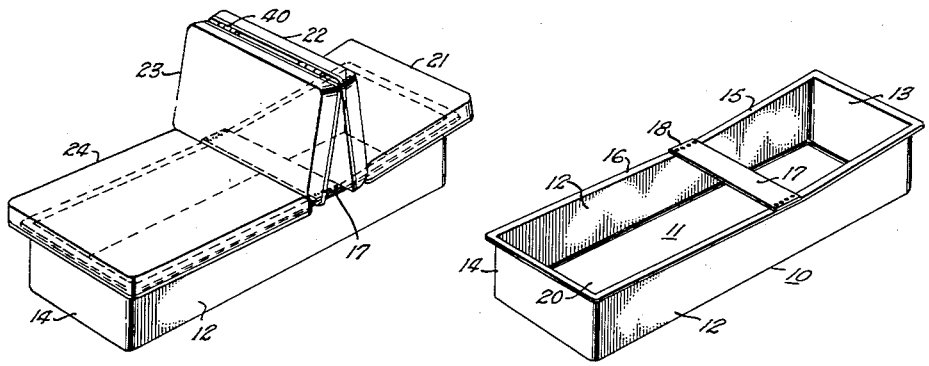
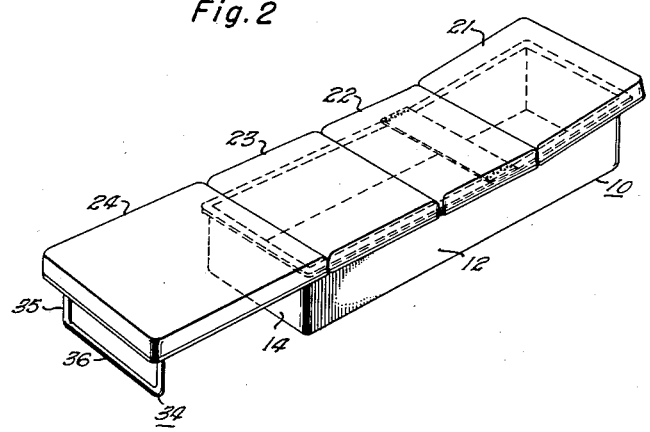
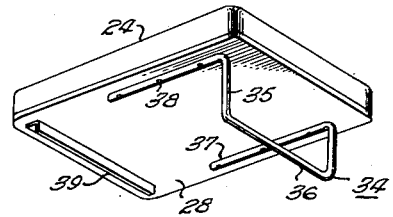
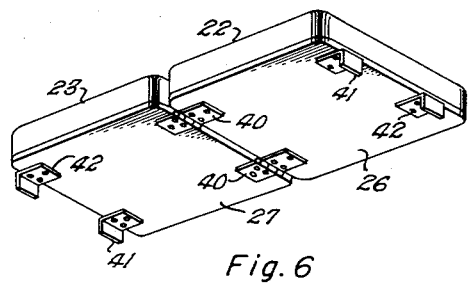
INVENTORS
George C. Rorie
James W. Alford
BY *Ihley & Ihley*
ATTORNEYS Feb. 14, 1961 G. C. RORIE ET AL 2,971,568
CONVERTIBLE SEAT Filed June 29, 1959 2 Sheets-Sheet 2

INVENTORS
George C. Rorie
James W. Alford
BY
ATTORNEYS

United States Patent Office 2,971,568
Patented Feb. 14, 1961

2,971,568
CONVERTIBLE SEAT

George C. Rorie, Dallas, and James W. Alford, Arlington, Tex., assignors to Lone Star Boat Company, Grand Prairie, Tex., a corporation of Texas Filed June 29, 1959, Ser. No. 823,567

4 Claims. (Cl. 155—45)

This invention relates to new and useful improvements in convertible seats.

One object of the invention is to provide an improved seat which is readily convertible into a bed or bunk and which is particularly adapted for use in boats.

Another object of the invention is to provide an improved convertible seat which has a base for supporting removable cushions and which is capable of being used as a refrigerator or other storage compartment.

A further object of the invention is to provide an improved convertible seat having a plurality of coacting cushions arranged to be supported by a base to form a pair of seats in back-to-back relationship, the seat back cushions being pivotally connected at their upper margins for movement into substantially coplanar relation to the seat bottom cushions to form a bed or bunk and one of said bottom cushions having depending support means to permit extension thereof beyond the base for accommodating the movement of said seat back cushions.

A construction designed to carry out the invention will be hereinafter described, together with other features of the invention.

Figure 7:
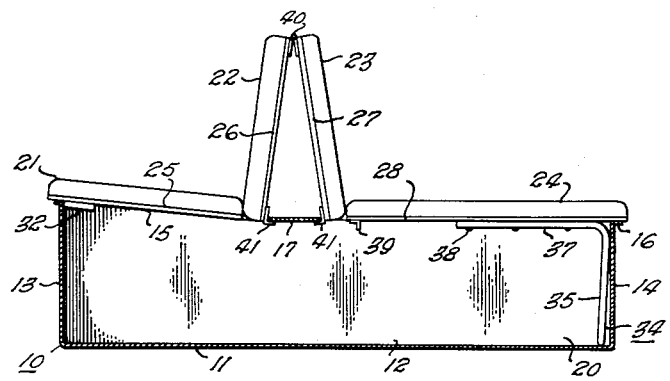
Figure 8:
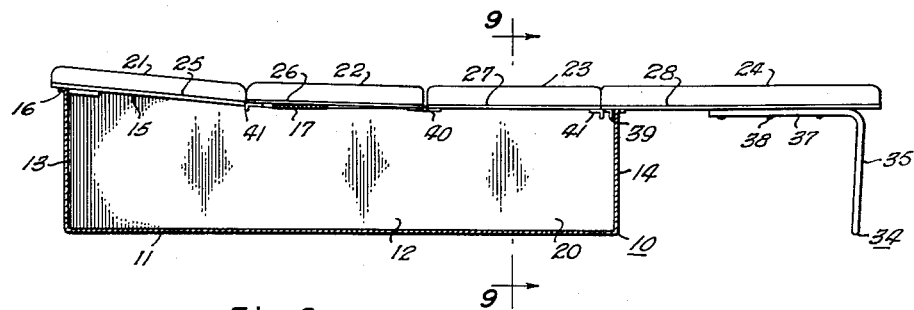
Figure 9:
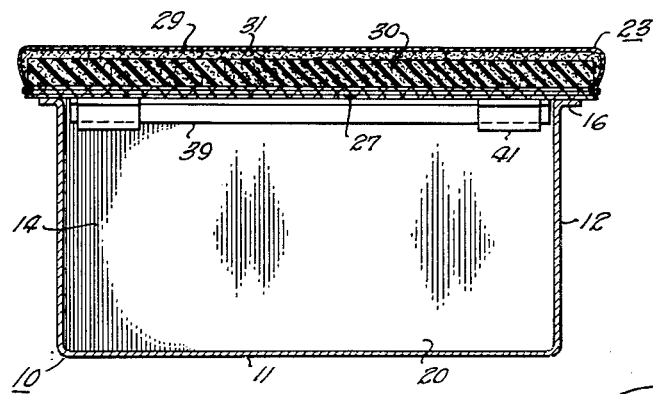

The invention will be more readily understood from a reading of the following specification and by reference to the accompanying drawings, wherein an example of the invention is shown, and wherein:

Fig. 1 is a perspective view of a convertible seat constructed in accordance with the invention and showing the cushions in position to form a pair of back-to-back seats, Fig. 2 is a perspective view of the base of the seat with the cushions removed, Fig. 3 is a perspective view of the seat with the cushions in bunk-forming position, Fig. 4 is a perspective view of the bottom cushion of the front seat, Fig. 5 is a perspective view of the bottom cushion of the rear seat, Fig. 6 is a perspective view of the seat back cushions, Fig. 7 is a longitudinal, vertical, sectional view showing the cushions in seat-forming position, Fig. 8 is a view, similar to Fig. 7, showing the cushions in bunk-forming position, and Fig. 9 is an enlarged, transverse, vertical, sectional view, taken on the line 9—9 of Fig. 8.

In the drawings, the numeral 10 designates the base of a convertible seat which is particularly adapted for use in a boat and which is in the form of a rectangular body or housing of greater length than width. The base includes a flat, horizontal bottom wall 11, complementary, upright side walls 12 and upright end walls 13 and 14. As shown by the numeral 15 in Figs. 2, 7 and 8, the upper margin of each side wall 12 may be inclined upwardly from its intermediate portion toward the front end wall 13 which may be of greater height than the rear end wall 14. With this exception, the walls of the base are rectangular and have a continuous, substantially horizontal flange 16 directed outwardly from their upper margins. A flat, rectangular member or bar 17 extends transversely between the side walls adjacent their inclined margins 15 and is secured in overlying relation to the flange 16 by suitable means, such as rivets 18. The walls of the base coact to provide a compartment or receptacle 20 which may be used as a refrigerator or for other storage purposes.

A plurality of rectangular cushions 21, 22, 23 and 24 are adapted to be supported by the continuous flange 16 of the side and end walls 12, 13 and 14 to form a pair of back-to-back seats as shown in Figs. 1 and 7 or a bed or bunk as shown in Figs. 3 and 8. The cushions are of the self-supporting type and have coextensive, rigid base members or plates 25, 26, 27 and 28 which may be formed of wood or other suitable material. As shown in Fig. 9, the cushions are of more or less conventional construction and each includes a cover 29 of suitable material overlying and attached to its base plate. A pad 30, of cotton or other material, and a layer 31, of rubberized hair or other material, are interposed between the base plate of each cushion and its cover 29. The cushions are of greater width than the base 10 so as to project beyond its side walls 12 with their base plates resting on the flange 16. As shown in Figs. 1 and 7, the cushions 21 and 24 form the bottoms of the seats while the cushions 22 and 23 coact to provide the backs of said seats.

The front seat bottom cushion 21 is substantially square and has an elongated, flat block or bar 32 secured to the underside of its base plate 25 and extending transversely in spaced relation to the front and side margins of said plate (Fig. 4). For holding the cushion against displacement, the length of the block 32 is substantially equal to the width of the compartment 20 and the end and front edge portions of said block are adapted to engage the inner surfaces of the walls 12 and 13. Due to the inclined upper margin 15 of the side walls, the cushion 21 is inclined downwardly and rearwardly to provide an ideal bottom for the front seat of a boat. As shown by the numeral 33, the front corners of the bar may be bevelled or chamfered to conform to the corners between the base walls.

The rear seat bottom cushion 24 is of greater length than width. A U-shaped support 34, having a pair of upright legs 35 connected at their lower ends by an integral, horizontal foot or bight portion 36, depends from the outer end portion of the base plate 28 (Fig. 5). The foot 36 extends transversely of the plate and the legs 35 have horizontal extensions or arms 37 extending from their upper ends longitudinally of said plate and toward its inner end. Screws or other fasteners 38 fasten the arms 37 to the underside of the base plate in parallel, spaced relation to its longitudinal margins. The support 35 is spaced inwardly from the outer end of the plate 28 and is of substantially the same width as the compartment 20 for engagement therein when the cushion 24 is in overlying relation to the rear portion of the base 10 as shown in Fig. 7. Upon extension of the cushion longitudinally rearward of the base to form a bed or bunk in coaction with the other cushions (Fig. 8), only the inner end of said cushion is supported by said base and the support 35 functions to maintain said cushion in a substantially parallel plane. In order to prevent displacement of the extended cushion, an angle bar 39 is secured to and extends transversely of the underside of the inner end portion of the plate 28 for engagement within the compartment and with the rear end wall 14. The bar and support coact to prevent displacement of the cushion when it is retracted.

As shown most clearly in Fig. 6, the seat back cushions 22 and 23 are identical and may be of greater width than length. Suitable hinges 40 pivotally connect the inner or upper margins of the base plates 26 and 27 to permit the cushion to be swung toward and away from each other. For connecting the cushions to the cross bar 17, a pair of angular elements or clips 41 are secured by screws or fasteners 42 to the underside of the outer or lower edge portion of each of the plates 26 and 27. The clips 41 have depending flanges projecting beyond the edge portions for engagement beneath the longitudinal margins of the bar 17 when the cushions are swung together in upright, back-forming position as shown in Fig. 7. The outer or lower margins of the back cushions are confined in engagement with the cross bar by the bottom cushions 21 and 24 and said cross bar functions as a spacer for said back cushions. Also, the cross bar co-acts with the cushions and their base plates to provide a removable top for the upper end of the compartment 20. The clips 41 are spaced so as to be disposed within the compartment to prevent displacement of the cushions in either position of the same. Upon extension of the bottom cushion 24, the cushions 23 may be slid rearwardly to permit downward swinging of the back cushions and overlying engagement into substantially coplanar relation to the seat bottom cushions. As shown in Figs. 8 and 9, the undersides of the plates 26 and 27 rest upon the flange 16 of the base walls 12 and 14 and coact with the base plates 25 and 28 to close the upper end of the compartment 20. By simple manipulation of the cushions, the seat may be readily converted to a bed or bunk whenever desired. Except for the support 35, there is no interference with the storage capacity of the compartment.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A convertible seat including a substantially rectangular base having upright end and side walls, a pair of spaced seat bottom cushions having portions overlying the end portions of the base and resting on the ends and side walls of the base, one of the said bottom cushions being movable longitudinally of the base to an extended position relative thereto, to provide a portion extending beyond said base, means depending from the outer end portion of the movable cushion to support said end portion when said cushion is extended; a pair of seat back cushions having outer end portions arranged to rest on the side walls of the base portion between the inner end portions of said bottom cushions when the movable bottom cushion is in retracted position, to thereby support the back cushions in upright position, and provide a pair of back to back cushions co-acting with said bottom cushions to form back to back seats, means for pivotally connecting the inner end portions of said back cushions to permit said back cushions to swing toward and away from each other, whereby said back cushions may be moved into co-planar relationship for resting on said side walls to form a bunk in co-action with said bottom cushions when said movable bottom cushion is extended, and means carried by the back cushions, engageable with the base member to limit the movement of such outer ends toward each other when the back cushions are in upright position.

2. The combination called for in claim 1 wherein the means for limiting movement of the outer ends of the back cushions toward each other when in upright position comprises a cross-member connecting the upper margins of the side walls of the base between the inner ends of the seat bottom cushions, and at least one lug extending outwardly from the inner side of each back cushion positioned underneath and against the cross-member to prevent further movement of the back cushions toward each other when in an upright position, and to prevent upward movement of said back cushions with reference to the base when in such upright position.

3. The combination called for in claim 1 wherein the movable bottom cushion has a depending portion thereon engageable with the end of the base to limit outward movement of the movable bottom cushion with relation to the base when in extended position.

4. The combination called for in claim 1 wherein the depending support means on the movable bottom cushion is arranged to be disposed within the base when the movable bottom cushion is retracted from its extended position into overlying relation to said base for confining said cushion against outward displacement with relation to the base.

References Cited in the file of this patent

UNITED STATES PATENTS

| | | |
|---|---|---|
| 321,825 | Koenig | July 7, 1885 |
| 343,265 | Bean | June 8, 1886 |
| 446,690 | Nelson | Feb. 17, 1891 |
| 1,271,701 | Griffith | July 9, 1918 |
| 2,754,888 | Palme | July 17, 1956 |
| 2,754,890 | Rubin | July 17, 1956 |

FOREIGN PATENTS

| | | |
|---|---|---|
| 238,494 | Great Britain | Aug. 20, 1925 |